Jan. 9, 1968   J. R. THURSTON ET AL   3,362,158
ARC IGNITION SYSTEM
Filed Feb. 23, 1966                          2 Sheets-Sheet 1

INVENTOR.
JAMES R. THURSTON
VERN T. DINSDALE
BY Thomas McBrennan

Jan. 9, 1968  J. R. THURSTON ET AL  3,362,158
ARC IGNITION SYSTEM
Filed Feb. 23, 1966  2 Sheets-Sheet 2
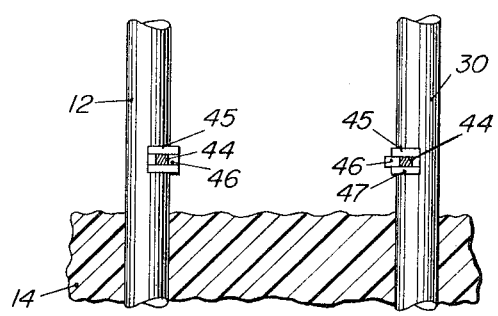
FIG. 6
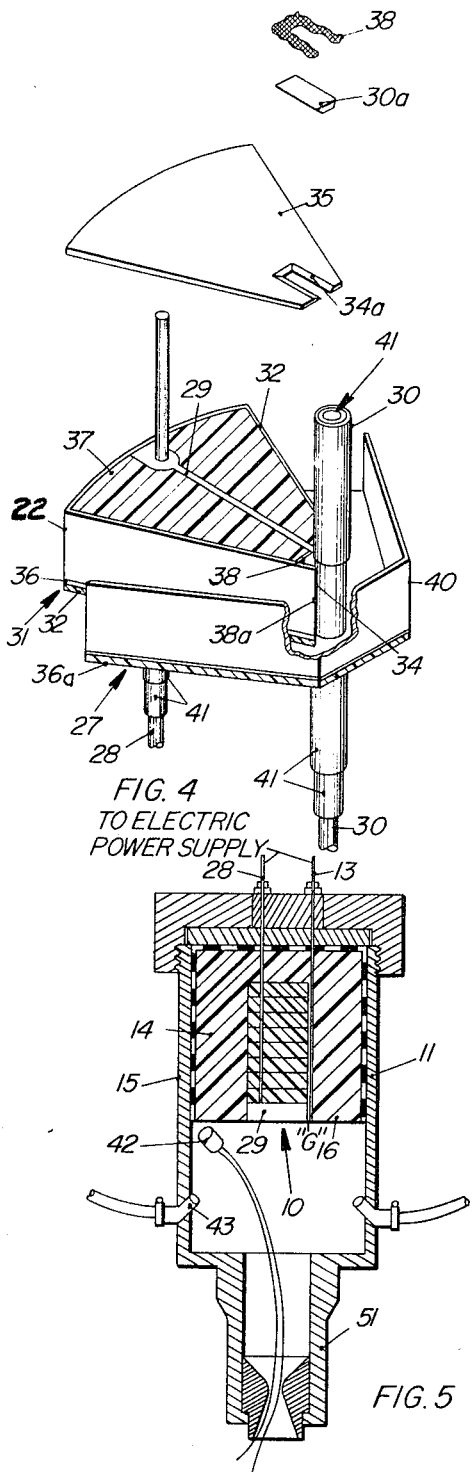
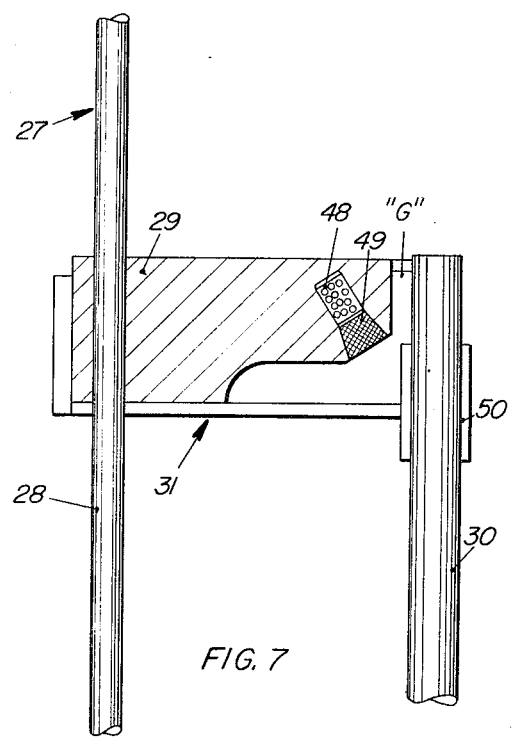
FIG. 7
INVENTOR.
JAMES R. THURSTON
VERN T. DINSDALE
BY
Thomas W. Brennan

United States Patent Office 3,362,158
Patented Jan. 9, 1968

3,362,158
ARC IGNITION SYSTEM
James R. Thurston and Vern T. Dinsdale, Brigham City, Utah, assignors to Thiokol Chemical Corporation, Bristol, Pa., a corporation of Delaware
Filed Feb. 23, 1966, Ser. No. 529,561
7 Claims. (Cl. 60—39.47)

This invention relates to ignition and ignition systems for solid propellant rocket motors. More particularly, it relates to reignition and systems therefor by means of electric arcs and the like.

A long-standing problem in the art of solid propellant rocket motors has been the starting, stopping and restarting thereof. Many routes have been traveled in attempting to solve this problem, however all have been found wanting in some degree. In general, stopping a burning solid propellant rocket motor is usually accomplished by quenching with water or liquids such as liquid nitrogen, liquified carbon dioxide, ammonia or the like, and such is contemplated for use in this invention, this aspect not being a part hereof but well known to the art.

Prior art means of restarting after quenching however, include multiple igniters positioned along the length of the motor to be operated in sequence as the propellant surface reaches them. In other instances a single igniter is recharged and refired to regain combustion of the propellant. Other systems have also been attempted such as injection of spontaneously combustible fluids into the quenched propellant surface.

However, while the former has proved to be somewhat satisfactory the latter for one reason or another, usually low reliability, unpredictable and/or unreproducible performance, high inert weight addition and various other reasons well known to the art have usually been unsatisfactory.

It is therefore an important object of this invention to provide an ignition system for a solid propellant rocket motor which renders the motor capable of undergoing multiple restarts after being stopped while still overcoming certain disadvantages above mentioned.

It is another important object of this invention to provide an ignition system of the type referred to wherein an electric arc, struck between juxtaposed electrodes immersed in the solid propellant, is utilized for reignition thereof after stopping.

It is still another object of this invention to provide an ignition system of the character described wherein a multiprobed electrode, juxtaposed with an additional electrode, is immersed in the solid propellant and helically wound about the second electrode in non-contacting electric arc receiving relationship.

It is a further object of this invention to provide an ignition system of the character described wherein a multiprobed electrode further includes intermediate ignition means therefor juxtaposed with an additional electrode, the whole immersed in the solid propellant, and means for providing an electric arc between one of said probes and said additional electrode at the surface of the propellant.

With these and other objects in view it will become readily apparent that the invention resides in certain novel constructions, combinations and arrangements of parts, hereinafter to be described and pointed out with particularity in the subtended claims and illustrated in the accompanying drawings in which:

FIGURE 4 is an exploded view of the invention of FIGURE 3 illustrative of its several parts;

FIGURE 5 is a view similar to FIGURES 1 and 2 illustrative of the electrodes of FIGURE 3 positioned in a rocket motor propellant;

FIGURE 6 is a detail of a pair of electrodes illustrating the destruction means used therefor; and FIGURE 7 is a detail, similar to FIGURE 6, of another electrode destruction means.

Figure 1:
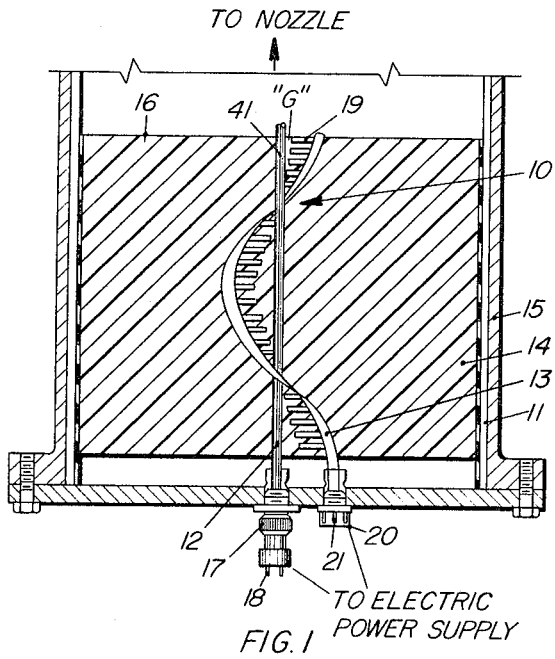
FIGURE 1 is a partial, sectional view of a rocket motor chamber and casing therefor showing the invention in its preferred form positioned therein.

Referring to the drawings, and in particular to FIGURE 1, the invention in its preferred embodiment is an ignition device or system 10 suitable for use in a rocket motor 11 of the solid propellant type. Ignition device 10 is comprised of a pair of electrodes 12 and 13 which are immersed in the propellant charge 14 in a casing 15. For purposes of this description, and for clarity, rocket motor 11 propellant charge 14 is of the so-called end burning or "cigarette" type and, as shown, electrodes 12 and 13 are end exposed in the surface 16 thereof which, in operation, is the burning surface of the propellant. As indicated in FIGURE 1, electrode 12 is centrally positioned in casing 15 in propellant 14 and is a single rod-like member fastened to the bottom or head end thereof by means of electrical coupling or connector 17. Electrodes 12 and 13 are covered with heat insulation material 41 to be described in what follows. Connector 17 is provided with socket 18 for connection to an electrical power supply (not shown). Electrode 12 is preferably a carbon rod however, carbon rods cladded with conductive metal such as copper and aluminum or the like have also been used.

Electrode 13, in FIGURE 1, is also centrally positioned in propellant 14 and fashioned in the form of a helix or spiral "comb" surrounding electrode 12. Electrode 13 has horizontally extending "comb teeth," arcing elements, or probes 19, which are juxtaposed with electrode 12 so as to provide an arc gap G therebetween. A second connector 20 having an electrical socket 21 is provided to secure helical electrode 13 to the head end of casing 15 and to connect it to the electrical power supply.

Figure 2:
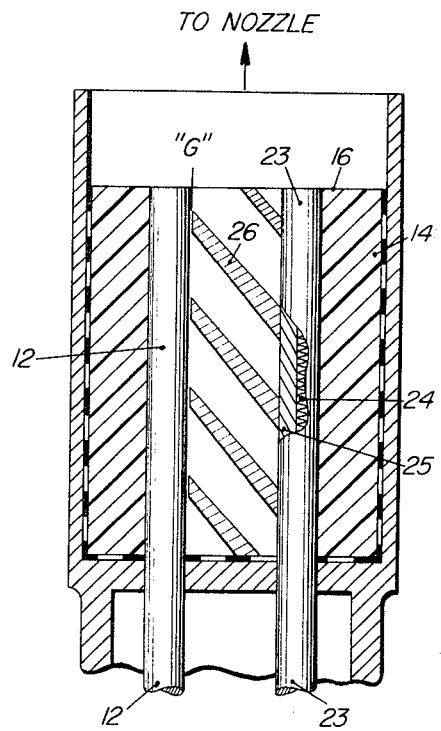
FIGURE 2 is a view similar to FIGURE 1 illustrating a second embodiment of the invention.

FIGURE 2 is illustrative of a second embodiment of the invention wherein electrode 12 is the same as in FIGURE 1 and immersed in propellant charge 14. However, electrode 13 is replaced with parallel electrode 23 which is provided with a longitudinally extending recess or slotted opening 24 for receiving carbon arc probe assembly or comb 25, having angular "teeth" or probes 26 extending toward electrode 12 to provide arc gap G as before.

Figure 3:
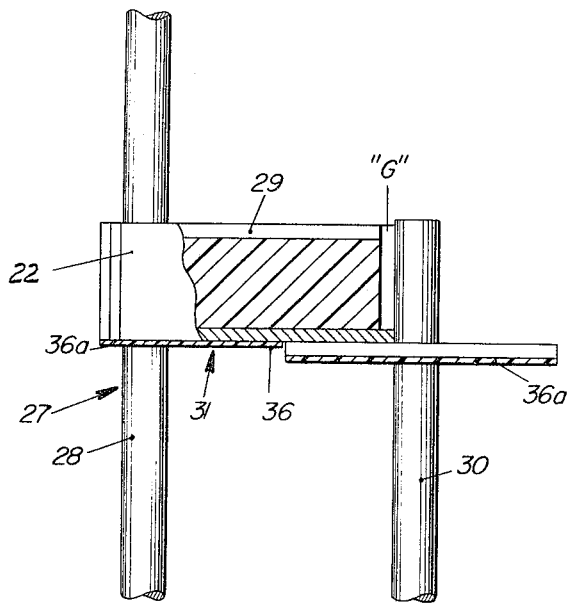
FIGURE 3 is a side elevational view of still another embodiment of the invention, illustrative of one of the electrodes with an intermediate ignition means.

FIGURE 3 illustrates a modified electrode 27 of the invention. Electrode 27 comprises conductor rod 28 and a horizontal arc probe 29. Horizontal probe 29 is attached to rod 28 in electrical conducting manner by force fit or by an adhesive of conductive quality such as silicone or the like, and extends therefrom to a point near electrode 30 so as to provide gap G therebetween. A gas generator 31 comprising a casing 22 of inert material surrounds probe 29 and, as indicated best in FIGURE 4, is generally triangular in shape having sides 32, which converge to form a nozzle-like aperture 34 in the vicinity of electrode 30, a top or cover 35 having an aperture 34–a and a plug 30–a, and a bottom 36 for containing a gas generating charge 37. Bottom 36 is coated with a fast burning material 36–a such as fuzing foil, beeswax, or a heat combustible foam or the like for a purpose later to be described. Charge 37 is insulated from the main motor propellant charge 14 by means of a potting compound 38 over a plastic plug 30–a of fluorocarbon material such as Teflon and the like. A shield or deflector 40 mounted on electrode 30 is provided to prevent erosion of the grain or charge 14 by exhaust gas when gas generator 31 charge 37 is operated.

FIGURE 4 further illustrates the electrode construction in general wherein, for example, conductor 28, fabricated of brass, copper or aluminum, and carbon electrode 30 are fitted with double thickness non-conductive, heat insulating shrinkable sleeves or tubings 41 of polyvinyl chloride plastic (PVC). It is preferable, however, to double tubing 41 between each igniter probe 29 (26 in FIGURE 2 and 19 in FIGURE 1), while maintaining a single thickness of tubing 41 within each igniter 31.

Referring now to FIGURE 5 there is shown the embodiment just described installed in motor 11 and submerged in propellant charge 14 thereof prior to initiation of combustion by means of a main charge igniter 42. Also indicated, in somewhat generalized form, are combustion quenching nozzles 43 which are supplied with a quenching fluid such as water, liquified $CO_2$, liquid $N_2$ or other inert fluid from a source not shown. Nozzles 43 are installed in motor casing 15 so as to direct a deluge of fluid against the burning surface 16 of a propellant charge 14, and are shown for illustrative purposes only being common to all embodiments.

As has been state heretofore it is preferred, in most instances, to select carbon as the material for the electrodes, especially for the probes in the arc gap G region. However, it has been found that in some instances the electrodes and/or the probes were not consumed during combustion, but remained intact after burning surface 16 receded. This is undesirable since unwanted arcing can occur outside of propellant charge 14. Accordingly, in these instances it has been found desirable to provide auxiliary breaking or destruction charges along the electrode length. FIGURE 6 is illustrative of one form of electrode destruction means wherein a small charge 44 of lead azide or the like is installed in a recess or cavity 45 in electrodes 12 and 30. A plastic holder 47, preferably from Teflon fluorocarbon material, surrounds auxiliary charge 44, and an aluminum barrier 46 protects charge 44 from premature discharge by burning propellant 14.

FIGURE 7 is illustrative of the use of a breaking or destruction means for destroying the horizontal carbon probe 29 in igniter system 27 which comprises an explosive charge 48 protected by a Teflon fluorocarbon insert 49. An additional breaking means for electrode 30 is also indicated as an externally mounted charge 50.

In operating the invention refer to FIGURE 1 and FIGURE 5. Propellant charge 14 is ignited by motor igniter 42 (FIG. 5) and is permitted to burn a predetermined time the duration of which is dependent upon the mission for which the motor 11 is considered. At a preselected time the combustion is quenched by fluid from deluge nozzles or injectors 43 and propellant surface 16 appears as indicated in FIGURE 1. To restart motor 11, and reestablish combustion of charge 14, electrical power is supplied through sockets 18 and 20 to electrodes 12 and 13 and an arc is struck across gap G at the exposed probe 19 to locally ignite propellant charge 14 in surface 16, and combustion recommences. Arcing within the propellant at one of the probes 19 other than the surface exposed probe 19 is prevented since the electrodes are insulated both by the propellant in charge 14 and by shrinkable sleeve or tubing 41 which is burned-off at surface 16. Sleeve or tubing 41 also serves as heat insulation to prevent premature ignition of below surface propellant by the heat developed in electrodes 12 and 13 (and in electrodes 23 of FIGURE 2, and conductor rod 28 of FIGURE 3) while electrified.

The electric arc is created at gap G by means of supplying the electrodes with high voltage thereby causing electron transfer from one electrode to the other (i.e., from cathode to anode). Electron collision causes ionization to build up on the electrodes and with increasing intensity thereof, a drop in potential occurs. The electrodes are highly ionized at this point and therefore begin emitting electrons and other electrified particles. Initially this emission of "thermionic" energy is noted by a peak in potential. The electrode particles being vaporized, are excited under these conditions, and subsequent intermolecular collisions degrade this energy to thermal energy of the vapor or gas. This thermal energy reaches thousands of degrees centigrade and results in the familiar electric arc. The arc acts as a resistor in an electrical circuit though its resistance decreases as the current increases.

It has been noted that arc ignition provides several sources of thermal energy which are utilizable to operate in the invention herein in a solid propellant rocket motor. One source of heat is that of conduction from the heated electrodes, another is radiant heat, and still another, convective heat from the arc itself.

Operation of the invention shown in FIGURE 2 proceeds all essentials the same as above described. Electrodes 12 and 23 are electrified, initially by a high potential source such as a capacitor or the like (not shown) causing an arc across gap G between electrode 12 and probe 26. In practice the arc is sustained until combustion of propellant charge 14 occurs by means of a low voltage-high current DC power supply (indicated, but not shown, in FIGURE 1). Charge 14 continues to burn until quenched whereupon reignition, if desired, is easily effected by again applying electric power to electrodes 12 and 23, since surface 16 will have receded sufficiently to permit the striking and sustaining of an arc at gap G. In this regard a new probe 26 will be exposed or be sufficiently close to propellant surface 16 so that an arc can easily be created.

Operation of the invention illustrated in FIGURES 3 and 4 is initiated in the same or similar manner as the previous invention embodiments, i.e., by striking an arc in gap G. Heat from the arc destroys plug 30-a and potting compound 38 igniting gas generator propellant 37. Gases from burning propellant 37 are exhausted through nozzle-like apertures 34 and 34-a and thereafter ignite main propellant charge 14, which will continue to burn unless quenched or otherwise extinguished. It has been found that an arc can be struck for vertical distances of up to one-half inch depending upon gap G distance and the rod thickness. Therefore a continuous stop-start capability of motor 11 is insured by providing an igniter 10 for each one-half inch of propellant depth. And, since it is not necessary to provide more than about 15 grams of gas generator propellant for ignition of most motor 11 sizes, the configuration of FIGURE 3 or FIGURE 4 is readily adaptable to meet this requirement.

As heretofore indicated, bottom 36 of generator container is coated with a faster burning (than propellant charge 14) substance 36-a such as fuzing foil, beeswax or a combustible foam. In operation, this surface if not so treated, tends to reduce the gas evolution rate of charge 14 as surface 16 reaches bottom 36, since surface 16 area will be reduced by an amount equal to the area of bottom 36. This in turn results in less gas evolution; hence by coating surface 36 as indicated, burning surface 16 area is effectively maintained and the rate of gas evolution preserved.

The operation of the gas generator form of the invention is also readily understood by reference to FIGURE 5, which is illustrative of a preferred placement of a sufficient number of ignition systems or igniters 10 to accomplish the invention objectives. In this form, propellant charge 14 is ignited at surface 16 by primary igniter 42. Burning surface 16 begins to recede upwardly uncovering an igniter 10. If it is required to extinguish combustion, water or other fluid, $CO_2$ and the like is supplied to injector devices 43 and sprayed in a deluge against surface 16 extinguishing the flame thereat. When restarting is required an electric arc is struck at gap G between electrodes 13 (vertical) 29 (horizontal) whereupon generator propellant 37 is ignited creating gas of sufficiently high temperature to reignite main charge 14.

As has been noted hereinbefore, when the carbon to carbon electrode system is chosen, and such is preferred, it is sometimes necessary to destroy electrodes 13, 29, and 12 (depending upon the igniter 10 embodiment utilized) since this material will not, in general, be consumed in burning propellant 14. This is done to prevent the arc from being struck outside the propellant surface 16 which would preclude obtaining ignition. This is accomplished by provision of explosive charge 48 in probe 29 and lead azide charge 44 in vertical electrodes 12 or 30 (FIGURE 6). Similar charges (not shown) are also provided in the base of probes 26 in comb electrode 25 in FIGURE 2. These charges 48 and 44 (and 50) are installed and sized to break their respective electrodes in small enough pieces to pass through the nozzle, for example, nozzle 51, in FIGURE 5, harmlessly.

Having described the invention in several of its embodiments and modifications, what is sought to be protected by Letters Patent of the United States is an improvement in the art of ignition of solid propellant motors, in general, and the art of restarting such motors after interim termination of the combustion process thereof, in particular. Other forms and modifications will no doubt occur to the skilled artisan in the field of the invention, therefore no undue limitations are to be imposed thereon except as set forth in the subtended claims.

What is claimed is:

1. A solid propellant rocket motor ignition system for rendering said motor capable of being restarted after shut down comprising, a first longitudinally, propellant burning surface extending electrode in said propellant, a second electrode adjacent said first electrode in said propellant, a plurality of probes extending from said second electrode and each juxtaposed with said first electrode to define a gap therebetween, means surrounding said electrodes and said probes for insulating them from each other to prevent electrical and heat contact thereof except at said burning surface of said propellant, and means for striking an electric arc in said electrode gap.

2. The invention of claim 1 wherein at least one of said electrodes is a spiral.

3. The invention of claim 1 wherein said probes extend from said second electrode so as to form an angle therewith.

4. The invention of claim 1 wherein one of said electrodes further includes at least one combustible charge containing casing surrounding each of said probes, said charge insulated from said motor propellant and arranged on said probe so as to be ignited by said arc in said gap.

5. The invention of claim 1 wherein said electrodes include explosive charges proximate said arc gap for destroying electrode portions exposed above said motor propellant burning surface.

6. The invention of claim 2 wherein said probes are affixed to said spiral electrode.

7. The invention of claim 4 wherein said casings are affixed along said second electrode at intervals of approximately one-half inch.

References Cited

UNITED STATES PATENTS

| | | | |
|---|---|---|---|
| 3,248,875 | 5/1966 | Wolcott | 60—254 |
| 3,267,672 | 8/1966 | Craig et al. | 60—39.82 X |
| 3,293,855 | 12/1966 | Cuttill et al. | 60—254 X |

CARLTON R. CROYLE, *Primary Examiner.*